United States Patent
Maier et al.

(10) Patent No.: US 12,064,818 B2
(45) Date of Patent: Aug. 20, 2024

(54) ADJUSTING DEVICE AND MACHINING SYSTEM

(71) Applicants: BLUM-NOVOTEST GMBH, Gruenkraut (DE); KOMET DEUTSCHLAND GMBH, Besigheim (DE)

(72) Inventors: Gregor Maier, Wolpertswende (DE); Wolfgang Rittler, Neukirch (DE); Roland Hoerl, Besigheim (DE)

(73) Assignees: BLUM-NOVOTEST GMBH, Gruenkraut (DE); KOMET DEUTSCHLAND GMBH, Besigheim (DE)

( * ) Notice: Subject to any disclaimer, the term of this patent is extended or adjusted under 35 U.S.C. 154(b) by 126 days.

(21) Appl. No.: 17/642,217

(22) PCT Filed: Sep. 1, 2020

(86) PCT No.: PCT/EP2020/074269
§ 371 (c)(1),
(2) Date: Mar. 10, 2022

(87) PCT Pub. No.: WO2021/047942
PCT Pub. Date: Mar. 18, 2021

(65) Prior Publication Data
US 2022/0314339 A1 Oct. 6, 2022

(30) Foreign Application Priority Data
Sep. 11, 2019 (DE) .................. 10 2019 006 414.3

(51) Int. Cl.
*B23B 39/10* (2006.01)
(52) U.S. Cl.
CPC .................. *B23B 39/10* (2013.01)

(58) Field of Classification Search
CPC .......... B23B 2229/16; B23B 29/03496; B23B 29/03492; B23B 29/03489; B23B 29/03432
See application file for complete search history.

(56) References Cited

U.S. PATENT DOCUMENTS 3,710,659 A * 1/1973 Pagella ............ B23B 29/03435
82/131
4,762,037 A * 8/1988 Stoffel ............. B23B 29/03492
82/131
(Continued)

FOREIGN PATENT DOCUMENTS

| DE | 102016114736 A1 * | 2/2018 | |
| EP | 1070536 A1 * | 1/2001 | ............. B01J 19/30 |
| EP | 1070563 A1 | 1/2001 | |

OTHER PUBLICATIONS

English translation of DE-102016114736-A1 (Year: 2018).*
(Continued)

*Primary Examiner* — Alan Snyder
(74) *Attorney, Agent, or Firm* — TAROLLI, SUNDHEIM, COVELL & TUMMINO L.L.P.

(57) ABSTRACT

In order to provide an adjustment device (1), which can be driven in rotation about a longitudinal axis (2), for adjusting a cutting tool, comprising a cutting tool carrier element (3) mounted for carrying out an adjusting movement (6), a drive unit (13, 13b) for driving the cutting tool carrier element (3) and a circuit carrier element (200), which has a surface region facing the drive unit (13, 13b), for forming at least one electronic control circuit (500, 510, 520, 530) provided for controlling the drive unit (13, 13b), 13b), which allows an improved compact design so that instabilities of the main drive element, in particular a tool spindle, are better avoided and the machining space is better utilised, it is proposed that two surface points (600, 610) of the surface area (220) can (Continued)

be connected outside the circuit carrier element (200) by a connecting straight line (620), the end points of which are the surface points (600, 610).

13 Claims, 5 Drawing Sheets

(56) References Cited

U.S. PATENT DOCUMENTS

| | | | |
|---|---|---|---|
| 6,367,359 B1 * | 4/2002 | Ropos | B23B 29/03467 |
| | | | 82/1.4 |
| 2017/0350389 A1 | 12/2017 | Quintarelli | |
| 2019/0176243 A1 * | 6/2019 | Fenollosa | H03K 17/964 |

OTHER PUBLICATIONS

International Search Report and Written Opinion issued in connection with corresponding patent application No. PCT/EP2020/074269 dated Dec. 1, 2020.
Search Report issued in connection with German Application No. 10 2019 006 414.3.

* cited by examiner

ADJUSTING DEVICE AND MACHINING SYSTEM

RELATED APPLICATIONS

The present invention is a U.S. National Stage under 35 USC 371 patent application, claiming priority to Serial No. PCT/EP2020/074269, filed on Sep. 1, 2020; which claims priority from German Patent Application No. 10 2019 006 414.3 filed on Sep. 11, 2019; the entirety of both are hereby incorporated herein by reference.

The present invention relates to an adjustment device, adapted to be driven in rotation about a longitudinal axis, for adjusting a cutting tool, comprising a cutting tool carrier element supported for carrying out an adjusting movement, a drive unit for driving the cutting tool carrier element and a circuit carrier element, having a surface region facing the drive unit, for forming at least one electronic control circuit provided for controlling the drive unit.

The present invention further relates to a cutting system comprising a cutting tool, an adjustment device operatively connected to the cutting tool for adjusting the cutting tool, and a rotationally drivable main drive element operatively connected to the adjustment device for providing a machining movement of the cutting tool.

According to the prior art shown in FIG. 1 of DE 44 31 845 A1, a machining system of the type mentioned above comprises a lowerable, displaceable main drive element 14 which is rotatable about the longitudinal axis 12 and on the tool holder 16 of which an adjustment device 18 of the type mentioned above is clamped. The adjustment device 18 has a cutting tool carrier element 24 which can be displaced by motor in the direction of the double arrow 22 and has a tool holder 26 for a cutting tool 30 fitted with a cutting insert 28. When the main drive element 14 and thus the adjustment device 18 are rotated about the longitudinal axis 12, the cutting insert 28 is moved relative to the longitudinal axis 12 along a circular path in accordance with a motor-set radial adjustment, and in this way can be brought into engagement with a workpiece to be machined, for example in order to produce a bore therein or to widen a bore. The diameter of the circular path is usually referred to as the flying circle diameter. By mounting the cutting tool support element 24 to perform the adjustment movement, the flight circle diameter can be changed by motor in the direction of the double arrow 22. Thereafter, radially differently spaced inner and/or outer areas of the workpiece relative to the longitudinal axis 12 can be machined and thus, for example, different bore diameters can be realised. In particular, the adjustment device 18 can be used to compensate for cutting-wedge wear in order to maintain a predetermined machining diameter by adjusting the flight circle diameter accordingly by means of the motorised adjustment of the cutting tool support element 24.

The adjustment device 18 or the machining system require a relatively large amount of installation space, particularly along the longitudinal axis 12, i.e. axially. This is disadvantageous because it reduces the stability of the main drive element 14, i.e. in particular a tool spindle, and at the same time, in particular in the case of a stationary clamped workpiece to be machined, the machining space.

The object of the present invention is therefore to provide an adjustment device of the type mentioned above and a machining system of the type mentioned above, each of which enables an improved compact design so that instabilities of the main drive element, in particular a tool spindle, are better avoided and the machining installation space is better utilised.

This task is solved with regard to the adjustment device by an adjustment device according to claim 1. Advantageous further embodiments are indicated in the dependent claims.

The adjustment device, adapted to be driven in rotation about a longitudinal axis, for adjusting a cutting tool, comprises a cutting tool carrier element supported for carrying out an adjusting movement, a drive unit for driving the cutting tool carrier element and a circuit carrier element, which has a surface region facing the drive unit, for forming at least one electronic control circuit provided for controlling the drive unit, wherein two surface points of the surface region are arranged to be be connected outside the circuit carrier element by a straight connecting line, the end points of which are the two surface points. The fact that the two surface points of the surface area can be connected outside the circuit carrier element by means of the straight connecting line, the end points of which are the two surface points, means that the circuit carrier element, which can preferably be in the form of a printed circuit board, in particular a multilayer printed circuit board, can control the drive unit, for example in the region of a gearbox, in particular a planetary gearbox or spur gearbox, of the drive unit and/or of a shaft element, in particular a gearbox shaft element and/or a motor shaft element, of the drive unit and/or of a motor, in particular an electric motor, of the drive unit, in a circumferential direction of the drive unit. Accordingly, in particular an axial dimension of the circuit carrier element and thus of the adjustment device, in particular when the circuit carrier element is arranged in a housing and/or a base body of the adjustment device, is reduced. As a result, in particular the co-torque acting on a main drive element, in particular a tool spindle, which may be connected to the adjustment device, by means of the adjustment device is reduced. Consequently, the tool spindle can be operated at higher speeds, which results in a shorter machining time and thus a more cost-effective machining operation, i.e. the stock removal rate is increased. By the fact that the two surface points of the surface area can be connected outside the circuit carrier element by the connecting straight line, the end points of which are the two surface points, the correspondingly shortened axial construction of the circuit carrier element, in particular when the circuit carrier element is arranged in a housing and/or a base body of the adjustment device, the maximum available distance between a fixedly clamped workpiece to be machined and the adjustment device is advantageously increased, so that the axial dimension of the workpiece dimensioned in the clamped state of the workpiece can be selected to be larger. Consequently, due to the associated larger machining space, in particular in the case of an arrangement of the adjustment device in a machining centre, workpieces of different sizes and also poorly accessible workpiece contours of such workpieces can be machined in an improved manner.

In that the two surface points of the surface area can be connected outside the circuit carrier element by the connecting straight line, the end points of which are the two surface points, the circuit carrier element can also be formed curved about the longitudinal axis, in particular by means of a recess, such that an imbalance which can be caused by a rotation about the longitudinal axis of the adjustment device is reduced because a mass of the circuit carrier element can be arranged uniformly or at least more uniformly about the longitudinal axis due to the shape of the surface area, i.e. that the connecting straight line, the end points of which are the two surface points, extends outside the circuit carrier element. A particular advantage is thus provided by the fact that a mass distribution of the circuit carrier element with respect to a circumferential direction of the drive unit is distributed more homogeneously about the longitudinal axis. Accordingly, the circuit carrier element can preferably be formed as a hollow cylinder or preferably as a plate, in particular a printed circuit board, which has a recess, the longitudinal axis running in sections within the hollow cylinder or the recess, in particular a bore. In the case of the hollow cylinder, the connecting straight line, the end points of which are the two surface points, for example, connects two diametrical surface points on the inside of the hollow cylinder to one another. In the case of the plate, i.e. in particular the printed circuit board, the straight line whose end points are the two surface points connects, for example, two surface points which are surface points of the surface radially delimiting the recess, i.e. in particular an inner wall of a hole of the circuit carrier element. In these two cases, the installation space volume of the adjustment device is reduced in a particularly simple manner and, at the same time, any imbalance that may be caused by the circuit carrier element when it rotates about the longitudinal axis is reduced.

The fact that the two surface points of the surface area can be connected outside the circuit carrier element by the connecting straight line, the end points of which are the two surface points, improves the axial and radial accessibility of the adjustment device. Consequently, the adjustment device can be provided in a particularly simple and thus cost-effective manner, for example in the event of an adjustment of the adjustment device or a replacement of, for example, the drive unit or components thereof.

Due to the fact that the two surface points of the surface area can be connected outside the circuit carrier element by the connecting straight line, the end points of which are the two surface points, the dimensions and thus material of the adjustment device can be reduced, in particular when the circuit carrier element is arranged in a housing and/or a base body of the adjustment device, because the housing or the base body can be made shorter and thus lighter without impairing the function. Due to the shortened axial construction of the circuit carrier element, the mass of the adjustment device can therefore be reduced at the same time, which has a positive effect on the stability of a main drive element, in particular a tool spindle.

At this point, it is expressly stated that the circuit carrier element can preferably be monolithic, for example comprising one, in particular multi-layer, base plate, in particular in the form of a printed circuit board, or preferably modular, for example comprising several base plates, in particular printed circuit boards, which are detachably connected to each other. The former is preferably advantageous for the bending strength, the latter preferably for the constructive design freedom.

In that the circuit carrier element is shaped to form the electronic control circuit, the circuit carrier element is particularly suitable for electrical conductor tracks to be provided on and/or in the circuit carrier element, for example between two circuit carrier element layers of the circuit carrier element, and/or for the circuit carrier element to be able to be equipped and/or fitted with at least one electronic component such as a microchip, an electrical resistance element, an electrical capacitor or an induction coil in accordance with the circuit.

By the control circuit is meant in particular a control circuit which is suitable for activating the drive unit in a predetermined manner on the basis of one or more input signals, i.e. in order, for example, to set a motor, in particular an electric motor of the drive unit, to an energy-flow state.

Preferably, the circuit carrier element already comprises the control circuit. Even more preferably, the circuit carrier element has means for receiving, for example comprising at least one electrical connector element, the at least one input signal. Even more preferably, the circuit carrier element comprises means, for example comprising at least one microchip, for processing the at least one input signal in accordance with the data. Even more preferably, the circuit carrier element has means for transmitting the at least one input signal, whether in data-processed form and/or in data-unprocessed form, to the drive unit.

By the surface area of the circuit carrier element facing the drive unit is preferably meant that a surface area of the drive unit can be connected to the surface area of the circuit carrier element by an orientation line whose end points lie on the drive unit and the circuit carrier element, the orientation line running outside the circuit carrier element between these two different surface areas. The orientation line may lie in an orientation plane whose normal vector includes an orientation angle with the longitudinal axis, the orientation angle being greater than or equal to 0°, 5°, 10°, 15°, 20°, 25°, 30°, 35°, 40°, 45°, 50°, 55°, 60°, 65°, 70°, 75°, 80°, 85° and less than 90°. The orientation angle is preferably 0°, according to which the orientation plane is oriented perpendicularly to the longitudinal axis, so that an imbalance that can be caused by the circuit carrier element can be reduced in a particularly optimal manner, namely in the radial and axial direction in each case with respect to the longitudinal axis.

By running outside the circuit carrier element is meant in particular that the connecting line between the two surface points runs or runs outside a materially solid area of the circuit carrier element. This is particularly the case if this connecting line runs or runs inside a recess, preferably a hole, of the circuit carrier element.

At this point, it is expressly stated that for the purposes of the present disclosure, the term "longitudinal axis" is to be understood in the geometric sense, unless otherwise disclosed. Particularly preferably, the longitudinal axis is aligned or can be aligned with a rotational axis of a main drive element, in particular a tool spindle.

In particular, the adjustment device is shaped to extend along the longitudinal axis. Preferably, the longitudinal axis is located inside the adjustment device.

The surface area of the circuit carrier element facing the drive unit can preferably be composed of one or more curved individual surface areas of the circuit carrier element. Alternatively or additionally, the surface area of the circuit carrier element facing the drive unit can be composed of several flat surface areas which are arranged at an angle to one another, for example according to an internal surface angle of 90°, 95°, 100°, 105°, 110°, 115°, 120°, 125°, 130°, 135°, 140°, 145°, 150°, 155°, 160°, 165°, 170° or 175° in each case. The flat surface sections can preferably be arranged in pairs, each forming a right, i.e. 90°, inner surface angle. It is conceivable and also possible that the surface area of the circuit carrier element facing the drive unit is composed of the curved and flat surface areas mentioned.

The surface area of the circuit carrier element facing the drive unit is preferably the surface area that is first formed by a recess in the circuit carrier element. This is a cost-efficient measure that saves installation space.

In the direction of view from the drive unit to the circuit carrier element, the surface area of the circuit carrier element facing the drive unit is preferably visible as a concave surface area of the circuit carrier element. This measure further reduces an imbalance that can be caused by the circuit carrier element and at the same time reduces the installation space volume of the adjustment device. Particularly preferably, the surface area facing the drive unit is concave in hemispherical form when viewed in the direction of the drive unit.

In the sense of the present disclosure, the drive unit is set up to drive the cutting tool carrier element so that it can execute the adjustment movement. For this purpose, the drive unit comprises, for example, a motor, in particular an electric motor, with a motor shaft. Even more preferably, the motor shaft is operatively connected, in particular by means of a gear connection, to a gearbox, which particularly preferably comprises a gearbox output shaft, wherein a rotational speed n1 of the gearbox output shaft in a driven state of the gearbox is lower than a rotational speed n2 of the motor shaft, according to which the gearbox is designed as a reduction gearbox. In this way, a particularly precise adjustment of the cutting tool carrier can be provided. Preferably, the speed n2 of the motor shaft is greater than the speed n1 of the gearbox output shaft by at least a factor of 10, 20, 30, 40, 50, 60, 70, 80, 90, 100, 200, 300, 400, 500, 600, 700, 800, 900, 1000, 1100, 1200, 1300, 1400, 1500, 1600, 1700, 1800, 1900, 2000 or more. This measure makes it possible to use compact, high-revving electric motors, such as those used in the field of toy construction, in a particularly advantageous manner.

The adjustment movement is preferably linear, because this is particularly useful for drilling a hole, for example. Even more preferably, the adjustment movement is then linear in translation.

The adjustment movement is preferably radially oriented or orientable, i.e. in particular transverse to the longitudinal axis. Preferably, the adjustment movement can be assigned a correspondingly radial, in particular maximum achievable, distance which is less than or equal to 100 mm, 95 mm, 90 mm, 85 mm, 80 mm, 75 mm, 70 mm, 65 mm, 60 mm, 55 mm, 50 mm, 45 mm, 40 mm, 35 mm, 30 mm, 25 mm, 20 mm, 15 mm, 10 mm, 9 mm, 8 mm, 7 mm, 6 mm, 5 mm, 4 mm, 3 mm, 2 mm, 1 mm, 0.9 mm, 0.8 mm, 0.7 mm, 0.6 mm, 0.5 mm, 0.4 mm, 0.3 mm, 0.25 mm, 0.2 mm, 0.15 mm, 0.1 mm, 500 µm, 400 µm, 300 µm, 100 µm, 50 µm, 25 µm, 10 µm, 5 µm, 1 µm, 0.5 µm or 0.25 µm. These are particularly useful ranges of adjustment for machining metallic workpieces.

Preferably, the drive unit is arranged so that the adjustment movement can be performed incrementally with a linear step size equal to 10 µm, 9 µm, 8 µm, 7 µm, 6 µm, 5 µm, 4 µm, 3 µm, 2 µm, 1 µm or 0.5 µm. This can also be expressed by corresponding incremental rotation angles of a gear shaft.

Preferably, the drive unit is designed to be self-locking, so that in a drive-free state of the drive unit an adjustment position of the tool carrier element is constant, preferably in the radial direction, i.e. in particular that a radial distance of the tool carrier element relative to the longitudinal axis is kept constant. This advantageously provides precise chip-removing machining by means of the adjustment device when the cutting tool is connected to the cutting tool carrier element.

Preferably, the cutting tool support element is designed for reversibly releasable fastening of the cutting tool. Preferably, at least one mechanical fastening element, in particular a screw element, is then provided, which can be reversibly releasably connected to at least one threaded element of the cutting tool support element. This measure makes it particularly easy to replace the cutting tool.

The circuit carrier element preferably has at least one electrical insulator layer or more preferably at least two insulator layers, for example comprising a plastic, in particular a cured plastic. In the case of at least two insulator layers, one or more electrical conductor tracks, preferably comprising copper or an alloy thereof or gold or an alloy thereof or silver or an alloy thereof, are preferably arranged and/or arrangeable between at least two adjacent insulator layers. Similarly, the material of the conductor track(s) can be selected for the case of an insulator layer, wherein the conductor track(s) are arranged and/or arrangeable on a surface thereof.

Even more preferably, the circuit carrier element has placement recesses, preferably holes, in which electrical contact elements of one or more components for forming the electronic control circuit can be arranged, preferably at least in sections in a form-fitting manner, in order to connect them in this way by means of one or more solder connections to the circuit carrier element and its electrical conductor track or tracks.

Preferably, the circuit carrier element already has the electronic control circuit, for example by equipping the circuit carrier element with a microchip. This is a particularly expedient measure, according to which the control of the drive unit is provided at a particularly low cost. For the formation of the electronic control circuit, at least one electrical resistance element, at least one electrical capacitor or at least one electrical coil, in particular at least one induction coil, can also be considered as an alternative or supplement.

Preferably, the adjustment device comprises a control assembly comprising the circuit carrier element, more preferably the control assembly comprises the circuit carrier element with the electronic control circuit formed. Preferably, the control assembly, for example by the circuit carrier element comprising receiving and signal processing means, is arranged to activate the drive unit in a predetermined manner.

The cutting tool support element can preferably be plate-shaped, wherein a support plate of the cutting tool support element has a contacting surface provided with grooves, which engages and/or can be brought into engagement with a contacting surface of a, in particular U-shaped, cutting wedge holder of the cutting tool, which contacting surface is shaped to correspond to the support plate. The cutting wedge holder, which may be included in the adjustment device and is preferably U-shaped, and the corresponding cutting wedge, which may be included in the adjustment device and has at least one cutting edge as well as a free surface associated therewith and a rake surface associated therewith, optionally form the cutting tool, which may be a milling cutter, a drill, a reamer or another cutting tool depending on the shape of the cutting wedge holder and the geometry of the cutting wedge. Several cutting wedges in and/or on the cutting tool are also conceivable and possible.

According to a further embodiment of the adjustment device, the connecting straight line passes through the drive unit. As a result, the drive unit can be particularly closely enclosed by the circuit carrier element, at least in sections, in a tangential direction. This further reduces the installation space volume of the adjustment device, in particular in the axial direction, and an imbalance that can be caused by the circuit carrier element. By piercing, it is preferably meant that the connecting straight line enters at one point of the drive unit in the geometrical sense and exits at another point of the drive unit in the geometrical sense. Preferably, these two points are diametrically opposed to each other. Preferably, the connecting line pierces the drive unit, for example in the region of a gearbox, in particular a planetary gearbox or spur gearbox, of the drive unit and/or a shaft element, in particular a gearbox shaft element and/or a motor shaft element, of the drive unit and/or a motor, in particular an electric motor, of the drive unit.

It is conceivable and also possible that the connecting line is tangent to the drive unit, for example in the area of a gearbox, in particular a planetary gearbox or spur gearbox, of the drive unit and/or a shaft element, in particular a gearbox shaft element and/or a motor shaft element, of the drive unit and/or a motor, in particular an electric motor, of the drive unit. This is a borderline case of the connecting line piercing the drive unit. This is another way to save installation space. However, it is also conceivable and possible that this limiting case does not apply.

According to a further embodiment of the adjustment device, the drive unit is arranged to be carried out at least in sections in a recess of the circuit carrier element. According to this, the circuit carrier element has a recess which can be obtained, for example, by drilling and/or milling, wherein the surface region of the circuit carrier element facing the drive unit is a surface region of a surface of the circuit carrier element radially delimiting the recess, i.e. in particular a bore inner wall. As a result, the drive unit can be enclosed even more closely by the circuit carrier element, at least in sections, in the tangential direction. This reduces the installation space volume and an imbalance that can be caused by the circuit carrier element accordingly even further. The recess can preferably be assigned two openings of the circuit carrier element which are connected to each other in a communicating manner and through which the longitudinal axis runs in sections. The openings are preferably circular or polygonal in shape.

At this point, it is expressly stated that the recess of the circuit carrier element can be annularly closed, as can be obtained, for example, by drilling and/or milling in a feed direction parallel to the longitudinal axis, or open in the radial direction, as can be obtained, for example, by drilling and/or milling in a feed direction parallel and transverse to the longitudinal axis. An annularly closed recess reduces an imbalance that can be caused by the circuit carrier element in a particularly advantageous manner. A radially open recess enables a particularly advantageous radial mounting of the circuit carrier element by allowing it to be pushed laterally over the drive unit.

Particularly preferably, the recess in the sense of the present disclosure is circular with a centre whose coordinates correspond to the, preferably two-dimensional, centre of gravity coordinates of the circuit carrier element, in particular in a circuit-free state. In this way, an imbalance that can be caused by the circuit carrier element is reduced in a particularly optimal manner.

Preferably, a plane surface section of the circuit carrier element adjacent to the recess can be assigned a normal vector oriented parallel to the longitudinal axis. According to this, the circuit carrier element is oriented perpendicular to the longitudinal axis at least in the area of the surface section, which saves installation space volume.

According to a further embodiment of the adjustment device, the recess is delimited by a circumferentially closed edge of the circuit carrier element. This preferably provides a circumferentially closed, preferably annular, recess so that the circuit carrier element accordingly surrounds the drive unit in a circumferentially closed manner in a circumferential direction of the drive unit, for example in the region of a gearbox, in particular a planetary gearbox or spur gearbox, of the drive unit and/or of a shaft element, in particular a gearbox shaft element and/or a motor shaft element, of the drive unit and/or of a motor, in particular an electric motor, of the drive unit. A circumferentially closed edge is obtainable in particular by drilling and/or milling a circuit carrier raw body element. This reduces the installation space volume and an imbalance that can be caused by the circuit carrier element accordingly even further, in particular because this enables a rotationally symmetrical arrangement of the circuit carrier element about the longitudinal axis. The circumferentially closed edge is thereafter preferably rotationally symmetrical, the longitudinal axis being a corresponding axis of rotational symmetry. The circumferentially closed edge can preferably be circular or polygonal, i.e. preferably square, rectangular, tetragonal, pentagonal, hexagonal, heptagonal, octagonal, nonagonal or decagonal. Preferably, in the case of a polygonal recess, the corners, i.e. the transitions between two adjacent surface areas, can be characterised by means of a finite radius of curvature, so that these transitions are continuously shaped. Even more preferably, the polygonal recess is equilateral.

Preferably, a centre of gravity of the circuit carrier element is arranged within the recess. As a result, the circuit carrier element is balanced or at least substantially balanced, which advantageously increases the mobility of the adjustment device.

Preferably, the circuit carrier element is shaped like a plate. This is a particularly expedient measure because it reduces the installation space volume even further. Then the circuit carrier element is preferably designed as a circular, in particular multilayer, printed circuit board, even more preferably along an outer circumference thereof. If the circuit carrier element is shaped like a plate, it can be assigned a plate thickness which is preferably constant, so that the risk of collision during assembly of the circuit carrier element is reduced and at the same time installation space volumes are saved.

According to a further embodiment of the adjustment device, a maximum longitudinal dimension of the circuit carrier element dimensioned parallel to the longitudinal axis is smaller than or equal to a maximum transverse dimension of the circuit carrier element dimensioned parallel to a transverse axis oriented perpendicular to the longitudinal axis. This further reduces the installation space volume, in particular in the direction of the longitudinal axis. In the case of a plate-shaped design of the circuit carrier element, this can be realised by the circuit carrier element being correspondingly inclined with respect to the longitudinal axis or, even more preferably, oriented perpendicular to the longitudinal axis.

According to a further embodiment of the adjustment device, a movement converter that can be kinematically coupled to the cutting tool carrier element and the drive unit is provided for converting a movement of a movement element of the drive unit into the adjustment movement. In this way, a movement, for example a rotary movement, of the movement element provided by the drive unit, which can be, for example, a gear output shaft of a gearbox, in particular a planetary gearbox or spur gearbox, of the drive unit and/or a motor shaft, for example a pinion, of a motor, in particular an electric motor, of the drive unit, can be converted in an advantageous manner into the adjusting movement, in particular linear and oriented transversely to the longitudinal axis. Particularly preferably, the movement converter is designed as an eccentric gear, with which a rotary movement of a gear output shaft of a gear, in particular a planetary gear or spur gear, of the drive unit and/or a motor shaft, for example a pinion, of a motor, in particular an electric motor, of the drive unit can be converted into the adjusting movement, in particular linear as well as oriented transversely to the longitudinal axis. Particularly preferably, the motion converter is arranged adjacent to the circuit carrier element, because this further increases the compactness of the adjustment device.

Preferably, the motion converter is kinematically coupled to the drive unit in such a way that, in a drive-less state of the motion converter, an adjustment position of the cutting tool support element can be kept constant, preferably in the radial direction, i.e. transversely to the longitudinal axis. Advantageously, this provides precise chip-removing machining by means of the adjustment device when the cutting tool is connected to the cutting tool carrier element. Self-locking provided in this way can be realised in particular by means of a gear, in particular a planetary gear or spur gear, of the drive unit if this is designed as a reduction gear.

According to a further embodiment of the adjustment device, the movement converter has a driver element which, in a driven state of the movement converter, orbits an axis of rotation and can be brought into engagement with a driver element guide of the cutting tool carrier element which is oriented differently from the axis of rotation, and the cutting tool carrier element has the driver element guide. This provides a particularly space-saving eccentricity mechanism, which also enables a particularly robust realisation of the adjustment movement. Preferably, the axis of rotation is aligned with the longitudinal axis, whereupon even more installation space volume is saved in the axial direction. The driver element is preferably formed as an axial projection, for example as a shaft journal, preferably a cylindrical shaft journal, of a coupling element which is rotatably mounted with respect to a base body and/or housing of the adjustment device and which can be formed, for example, in the shape of a disc, the coupling element being mounted, for example, on rolling elements or on sliding bodies, so that it can be rotated, for example, about the longitudinal axis. This is a particularly cost-effective as well as mechanically robust measure. The driver element can also be referred to as an eccentric pin. Preferably, the driver element guide is oriented transversely to the longitudinal axis. The driver element guide is preferably formed as a recess, preferably a longitudinal groove, in which the driver element engages, of the cutting tool carrier element. This is a particularly cost-effective as well as mechanically robust measure, especially with regard to interaction with the driver element. By transverse to the longitudinal axis may be meant, for example, that an orthogonal projection of the driver element guide into a projection plane oriented perpendicular to the longitudinal axis is larger in area than an orthogonal projection of the driver element guide into a projection plane oriented parallel to the longitudinal axis. Preferably, the driver element guide is radial with respect to the longitudinal axis. Preferably, the motion transducer element has a recess for positive and/or non-positive reception of the drive element. Preferably, the coupling element is connected in a rotationally fixed manner to a movement element of the drive unit, wherein the movement element may be a gear shaft, in particular a gear output shaft, of a gearbox, preferably a planetary gearbox or spur gearbox, of the drive unit and/or a motor shaft, in particular a pinion, of a motor, preferably an electric motor, of the drive unit. Thereafter, the drive unit can rotationally drive the coupling element so that the driver element orbits the longitudinal axis, i.e. is radially spaced at a non-zero distance from the longitudinal axis and orbits the longitudinal axis on a preferably circular path.

According to a further embodiment of the adjustment device, the movement converter is mounted in a bearing housing and the drive unit is reversibly detachably connected to the bearing housing on one side. This measure provides a particularly simple assembly or disassembly of the adjustment device. In the bearing housing, in particular a coupling element, which has the driver element, in particular in the form of an axial projection, for example a shaft journal, preferably a cylindrical shaft journal, can be arranged on rolling element bearings or on sliding element bearings. In particular, a mounting plate of a gearbox, in particular a planetary gearbox or spur gearbox, of the drive unit and/or mounting struts, which are connected to a motor, preferably an electric motor, of the drive unit, can be arranged on the bearing housing. Preferably, the bearing housing is non-rotatably connected to a housing and/or base body of the adjustment device.

According to a further embodiment of the adjustment device, at least one sliding element is provided for sliding in and/or on the driver element guide, and the driver element is operatively connected to the sliding element. This provides a measure optimised for sliding in the driver element guide, which in particular increases the efficiency and thus the effectiveness of the motion converter and thus of the adjustment device. Preferably, the sliding element is shaped as a sliding block whose geometry is adapted to the shape of such a groove in case the driving element guide is shaped as a longitudinal groove, which further reduces the frictional resistance. Preferably, the sliding element has a recess for receiving the driver element. Preferably, the sliding element is shaped such that a free maximum sliding distance of the sliding element in a sliding direction in the driver element guide, in particular a longitudinal groove, is smaller than a length of the sliding element dimensioned in the radial direction. This measure provides a particularly stable guidance of the sliding element in the driver element guide.

According to a further embodiment of the adjustment device, the driver element is mounted in and/or on the sliding element in rolling element bearings and/or sliding element bearings. This further increases the efficiency of the motion converter and thus of the adjustment device, because according to this further embodiment, friction between the sliding element and the driver element is reduced. If the sliding element is mounted on rolling elements, the sliding element is preferably mounted by means of at least one needle bearing and/or at least one ball bearing. This is a particularly useful measure for reducing friction.

According to a further embodiment of the adjustment device, the circuit carrier element is connected in a rotationally fixed manner to a base body of the adjustment device which is rotatable about the longitudinal axis, the base body having a connection section for connection to a tool spindle. This further increases the compactness of the adjustment device, because the base body serves on the one hand to fix the circuit carrier element and on the other hand to connect it to the tool spindle, so that in the event of rotation of the base body, the circuit carrier element is rotated with a rotational speed of the base body or the tool spindle. The rotationally fixed connection can be realised directly or indirectly. If it is implemented directly, the circuit carrier element is directly connected to the base body in a rotationally fixed manner, for example by means of a screw element connection, wherein at least one screw for fastening the circuit carrier element is arranged in a thread of the base body. If it is implemented indirectly, the circuit carrier element is connected in a rotationally fixed manner to a housing which is different from the base body and is connected in a rotationally fixed manner to the base body, at least one screw for fastening the circuit carrier element being arranged in a thread of the housing. The connecting section is designed in particular for connecting the base body and thus the adjustment device to an anti-rotation device and/or means for axial pretensioning of the base body.

According to a further embodiment of the adjustment device, the drive unit is arranged axially. This reduces, in a particularly advantageous manner, an imbalance that can be caused by the drive unit when the adjustment device rotates about the longitudinal axis. Furthermore, in the case of one or more lubricants, which may be included in the drive unit to reduce friction of parts that are movable relative to each other, centrifugation of these is avoided, which improves the service life of the drive unit and thus of the adjustment device. The parts movable relative to each other may be, for example, a motor shaft of an electric motor of the drive unit and a corresponding bearing and/or a gear shaft of a gearbox of the drive unit and a corresponding bearing and/or two or more meshing gears of a gearbox, for example a planetary gearbox or a spur gearbox, of the drive unit. Thereafter, it is particularly preferred if the longitudinal axis is/are aligned with a motor shaft of a motor, in particular an electric motor, of the drive unit, and/or a gear output shaft of a gearbox, for example a planetary gearbox or a spur gearbox, of the drive unit.

According to a further embodiment of the adjustment device, the drive unit and the movement converter are connected to each other to form a first assembly that can be axially dismantled or axially mounted separately from the circuit carrier element. This increases the disassembly, for example in the case of maintenance, and the assembly, for example in the case of assembly, of the adjustment device, because in each case the time required is reduced and at the same time a preassembly of the first assembly is made possible. Thus, the drive unit, in particular if it comprises a gear, can be reversibly releasably fastened by means of at least one screw element to a bearing housing in which the motion converter is rotatably mounted, so that the drive unit and the motion converter are connected to each other by means of the bearing housing to form the axially dismountable or axially mountable first assembly. By being axially dismountable or axially mountable, the first assembly is in particular accessible from one side, for example the front side of the adjustment device, which further contributes to the ease of dismounting or mounting. By axially dismountable or axially mountable separately from the circuit carrier element is meant in particular that the circuit carrier element remains in and/or on a housing or a base body of the adjustment device when the first assembly is dis mounted or mounted.

According to a further embodiment of the adjustment device, the drive unit, the movement converter, the cutting tool carrier element and the circuit carrier element are connected to each other to form an axially dismountable or axially mountable second assembly. This further increases the disassembly, for example in the case of maintenance, and the assembly, for example in the case of assembly, of the adjustment device, because in each case the time required is reduced and at the same time a preassembly of the second assembly is made possible. Thus, the drive unit, in particular if it comprises a gear, can be reversibly releasably fastened by means of at least one screw element to a bearing housing in which the motion converter is rotatably mounted, so that the drive unit and the motion converter can be assembled to form the axially dismountable or axially mountable first subassembly by means of at least one screw element. the drive unit and the movement converter are connected to one another with the aid of the bearing housing to form the axially dismountable or axially mountable first subassembly, and the bearing housing is fastened reversibly releasably in and/or on a housing of the adjustment device, in particular by means of at least one screw element, and the housing has a sliding surface for sliding the cutting tool carrier element, and the cutting tool carrier element is locked in the axial direction by a housing cover connected reversibly releasably to the housing, in particular by means of at least one screw element, so that the second subassembly is formed in this way, for example. By being axially dismountable or axially mountable, the second assembly is accessible in particular from one side, for example the front side of the adjustment device, which further contributes to the ease of dismounting or mounting.

According to a further embodiment of the adjustment device, the circuit carrier element is designed for data communication with the drive unit on a side facing away from the cutting tool carrier element. This improves the ease of assembly and disassembly because, for example, the drive unit, which can be a component of the first and/or second assembly, can be separated from or connected to the circuit carrier element particularly easily. The fact that the circuit carrier element is designed for data communication with the drive unit on a side facing away from the cutting tool carrier element preferably means that at least one plug-in contact is provided for connection to a conductor means, in particular a multi-core power cable, the conductor means preferably being connected to a printed circuit board of an electric motor of the drive unit.

According to a further embodiment of the adjustment device, the circuit carrier element has a functional surface facing away from and/or towards the cutting tool carrier element for circuit-compliant assembly. In the case of the facing away functional surface, the circuit carrier element can be positioned particularly advantageously close to the cutting tool carrier element because the functional surface has at least one elevation in an equipped state when the circuit carrier element is or will be equipped with at least one component of the electronic control circuit according to the circuit. In the case of the facing functional surface, the risk of assembly-related damage to the functional surface is minimised because it faces the corresponding assembler during assembly, so that the assembler can monitor the assembly accordingly.

According to a further embodiment of the adjustment device, a data line means is provided for data communication with the drive unit and the surface area facing the drive unit faces the data line means at least in sections. This provides a particularly simple structure of the adjustment device. Preferably, the data conduction means is designed as a multi-core power cable, in particular one of flat design, which is passed through a recess of the circuit carrier element. One end of the data line means is preferably connected in the sense of a plug contact to the circuit carrier element and another end of the data line means is preferably connected in the sense of another plug contact to a second circuit carrier element, which preferably has power electronics or a correspondingly designed circuit. The second circuit carrier element is preferably arranged perpendicular to the longitudinal axis. Preferably, the second circuit carrier element is configured as a printed circuit board. Preferably, the second circuit carrier element is operatively connected to a motor, preferably an electric motor, of the drive unit, i.e. in particular to one or more stator windings of the electric motor. The data communication can preferably be a unidirectional or bidirectional transmission of electrical signals, which can be referred to as control or feedback signals. The data communication can preferably be a unidirectional or bidirectional transmission of electrical signals, which can be designated as control or feedback signals, which are provided by a control circuit of the circuit carrier element designated as the first circuit carrier element with respect to the second circuit carrier element, so that the drive unit can drive the cutting tool carrier element, preferably by means of a gear of the drive unit and/or the movement converter, in a predetermined manner to execute the preferably linear and preferably transversely to the longitudinal axis oriented adjustment movement.

According to a further embodiment of the adjustment device, measuring means adjacent to the circuit carrier element are provided for measuring an adjustment distance that can be assigned to the adjustment movement, and the circuit carrier element is designed to provide a control signal on the basis of measurement data obtained by means of the measuring means. This is advantageous because it can be checked whether a predefined adjustment movement is being maintained, particularly with regard to the aspect that the cutting tool wears, in particular in the area of one or more cutting wedges. Preferably, the measuring means comprise an electronic data processing means for processing measurement data obtained by means of the measuring means, with which the circuit carrier element is or can be equipped in accordance with the circuit. Preferably, the measuring means comprise a displacement measuring device which is designed to detect the displacement according to an inductive and/or resistive and/or capacitive and/or optical principle. It is even more preferred if the cutting tool carrier element has at least one measuring scale and a base body and/or housing, with respect to which the cutting tool carrier element is mounted in such a way that the adjustment movement can be carried out, of the adjustment device has a sensor which can sense the measuring scale, or vice versa.

According to a further embodiment of the adjustment device, the drive unit comprises a toothed gear and an electric motor operatively connected to the toothed gear, wherein a gear shaft of the toothed genu can be brought into engagement with the movement converter and the circuit carrier element is arranged perpendicular to a gear axis which can be associated with the gear shaft. This is a particularly expedient measure because, depending on the number, arrangement or size of corresponding gears, a plurality of different speeds of the gear shaft, in particular in the form of a gear output shaft, can be provided by the gear transmission, which may be a planetary gear transmission and/or a spur gear transmission, at a predefined drive speed of a motor shaft of the electric motor. The fact that the circuit carrier element is arranged perpendicular to the gear axis, for example by arranging a normal vector of a surface section of the circuit carrier element parallel to the gear axis, also reduces the installation space volume.

According to a further embodiment of the adjustment device, it comprises a coolant channel system which is connected in communication with a coolant channel system of the cutting tool carrier element and wherein the circuit carrier element is arranged adjacent to at least one of the coolant channel systems. This optimises the adjustment device for increasing the service life of the cutting tool, because by means of the two coolant channel systems the cutting tool can be cooled in a chip-removing state and removed chips can be transported away from, for example, a bore inner wall, by flooding the two coolant channel systems with a coolant. Preferably, the coolant channel system of the cutting tool support element comprises a coolant channel opening so that coolant can exit the cutting tool support element. Preferably, sealing means are provided in order to seal an interface between the cutting tool support element and a housing and/or base body, with respect to which the cutting tool support element can be or is movably mounted, of the adjustment device against an escape of coolant.

According to a further embodiment of the adjustment device, it is designed to be connected to a tool spindle. In this way, the adjustment device can advantageously be connected to a tool spindle, so that in this way a rotary movement of the tool spindle can be transmitted to the adjustment movement and thus to the cutting tool carrier element. Preferably, the adjustment device has a hollow shank taper for connection to a tool spindle or the tool spindle. This is a particularly practical measure which provides a non-positive and positive connection with a correspondingly shaped tool spindle.

According to a further embodiment of the adjustment device, it comprises the cutting tool, which is reversibly releasably connected in an operative manner to the cutting tool carrier element, so that the cutting tool executes the adjustment movement in an activated state of the drive unit, wherein the cutting tool has at least one cutting wedge for chip removal. This advantageously provides an adjustable cutting tool which can be rotationally driven about the longitudinal axis at a relatively high speed, because the adjustment device does not cause any imbalance, or at least to a reduced extent, and at the same time has a compact design. According to this further embodiment, the adjustment device is preferably designed as a facing head and/or boring head. The cutting tool can preferably be a cutting tool, drilling tool, milling tool or reaming tool or the like. If the measuring means are provided in the adjustment device according to this further embodiment, a measuring tool is preferably provided with which, in particular, a bore diameter can be measured by means of a cutting wedge contact with a bore inner wall.

According to a further advantageous aspect of the invention, the invention is directed to a use of the adjustment device according to any one of claims 1 to 13 and/or the embodiments and/or further embodiments of the adjustment device disclosed herein to adjust a cutting tool, preferably in a radial direction, i.e. transversely to the longitudinal axis.

According to a further advantageous aspect of the invention, the invention is directed to a method for producing an adjustment device, which can be driven in rotation about a longitudinal axis, for adjusting a cutting tool, comprising at least the steps: a) supporting a cutting tool support element for carrying out an adjusting movement, b) providing a drive unit for driving the cutting tool support element, c) optionally kinematically coupling the cutting tool support element to a movement converter for converting a movement of a movement element of the drive unit into the adjusting movement and optionally kinematically coupling the movement element to the movement converter, d) providing a circuit carrier element for forming at least one electronic control circuit provided for controlling the drive unit, e) arranging the circuit carrier element in such a way that a surface region of the circuit carrier element faces the drive unit, f) arranging the circuit carrier element in such a way that two surface points of the surface region can be connected outside the circuit carrier element by a connecting straight line whose end points are the two surface points. In this way, an adjustment device with reduced installation space volume is produced, which at the same time is designed to reduce an imbalance that can be caused by it. Optionally, before and/or during step d), a recess is created, for example by drilling and/or milling, in and/or on the circuit carrier element and/or in step f) the drive unit is arranged to be carried out at least in sections in the recess, in particular if this is a bore.

The task is further solved by a machining system as disclosed herein.

The machining system comprises a cutting tool, an adjustment device operatively connected to the cutting tool for adjusting the cutting tool, and a rotationally drivable main drive unit element operatively connected to the adjustment device for providing a machining movement of the cutting tool, wherein the adjustment device is designed as disclosed herein.

This provides a machining system which, in particular in the region of the adjustment device, is designed to reduce the volume of installation space and, at the same time, to reduce an imbalance which can be caused by the adjustment device, according to which the main drive unit element can preferably be operated at a relatively high rotational speed and a workpiece to be machined can consequently be positioned particularly close to the machining tool in order to remove chips from the workpiece in order to produce a predetermined contour. Thereafter, the longitudinal axis is preferably a longitudinal axis of the main drive unit element, for example a tool spindle or the like, which is optionally operatively connected to a machining centre. The adjustment movement is preferably oriented transversely to the longitudinal axis and is linear.

According to a further advantageous aspect of the disclosure, the disclosure is directed to a use of the cutting system as disclosed herein for machining a, preferably metallic, workpiece.

Further advantages and usefulness of the invention will be apparent from the following description of an embodiment with reference to the accompanying figures.

In FIGS. 1 to 5, identical, similar or similarly acting elements are designated with identical reference signs and a repeated description of these elements is partially omitted in the following description in order to avoid redundancies.

Figure 1:
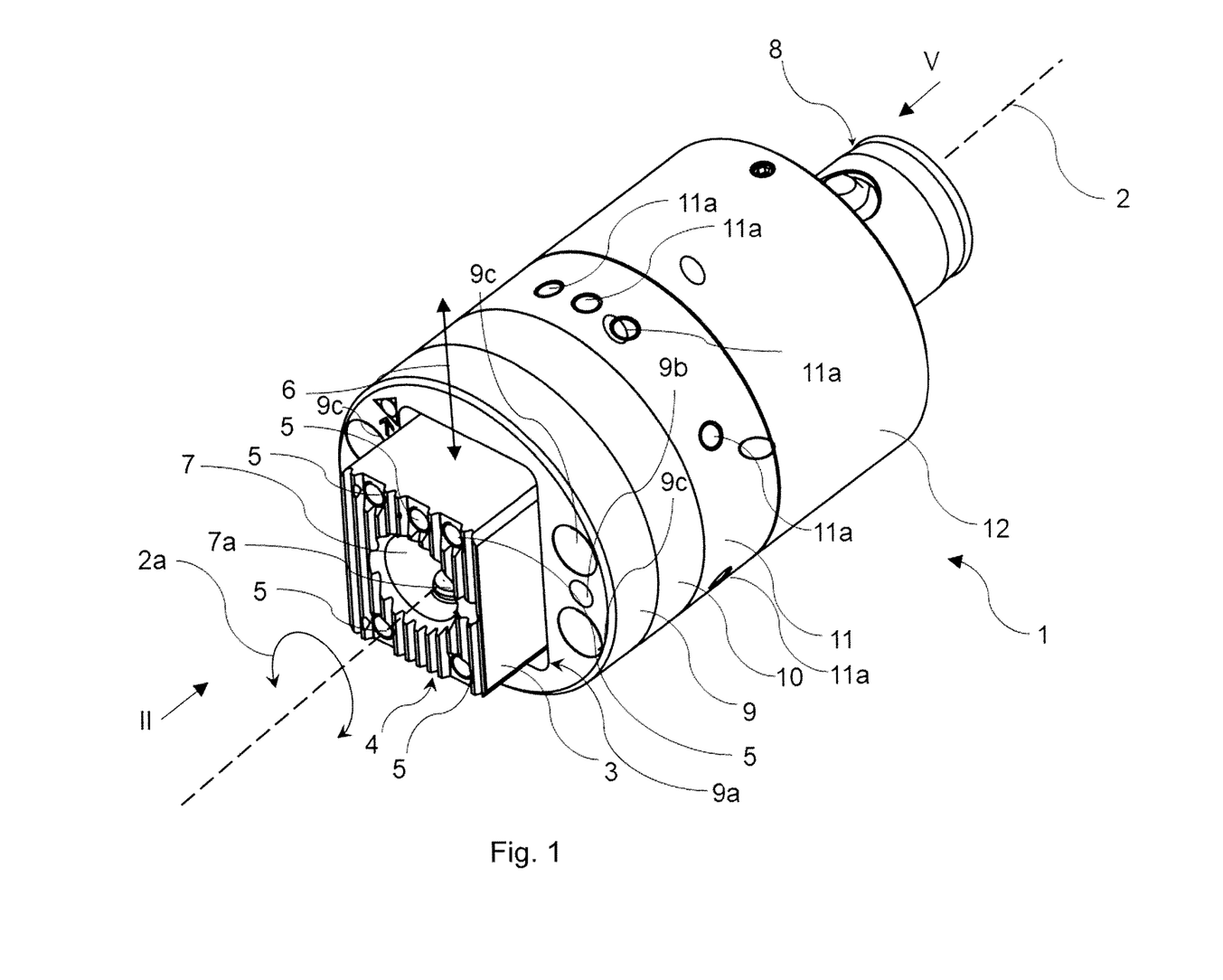
FIG. 1: A schematic perspective view of an adjustment device according to one embodiment, looking at the adjustment device from diagonally above on the right.

FIG. 1 shows a schematic perspective view of an adjustment device 1 according to one embodiment, as seen from an oblique top right view of the adjustment device 1. The adjustment device 1 can be rotated about a longitudinal axis 2 in any of the directions of rotation 2a, so that a cutting tool, which is not shown, is rotated about the longitudinal axis 2 when the cutting tool is connected to a carrier plate 3 and the adjustment device 1 is rotated about the longitudinal axis 2 by a spindle, which is not shown. For this purpose, the adjustment device 1 is reversibly releasably fastened to a connecting section 8 of a base body 12 with the spindle and the cutting tool is reversibly releasably fastened via a tool holder, which is not shown, to a surface 4, which is provided with grooves, of the carrier plate 3 by means of screws, which are not shown and which can be brought into engagement in threaded holes 5 of the carrier plate 3. The grooves of the surface 4 engage in these corresponding grooves of the tool holder, so that a form fit is formed in a direction transverse to the course of the grooves and positioning of the tool holder is guided in a direction parallel to the course of the grooves. The carrier plate 3 and thus the cutting tool are motor-adjustable in directions 6 which are oriented radially to the longitudinal axis, so that the cutting tool can be moved around the longitudinal axis 2 according to an adjustment on a flight circle diameter, for example, in order to produce a bore in a workpiece with a diameter which corresponds to the flight circle diameter. An adjustment of the carrier plate in 3 one of the directions 6, i.e. a forward and backward movement for adjusting the pitch circle diameter, is decoupled from a rotation of the adjustment device 1 about the longitudinal axis 2, so that the pitch circle diameter is independent of a rotational speed which can be assigned to a rotation of the adjustment device about 1 the longitudinal axis 2. A maximum adjustment of the carrier plate 3 in one of the directions 6 is, for example, 0.25 mm, measured transversely to the longitudinal axis 2. However, it is also conceivable and possible to have different amounts of adjustment of the carrier plate 3.

In FIG. 1, it can also be seen that the carrier plate 3 has a bore 7 which is connected to a coolant channel system, which will be discussed in more detail with reference to FIG. 3. The hole 7 further serves as anchorage for an anchoring portion, which is biasedly locked in a state inserted into the hole 7 by means of a pin 7a, of the tool holder.

FIG. 1 also shows that the carrier plate 3 protrudes from an opening 9a of a cover plate 9, so that the opening 9a forms a radial stop for the carrier plate 3 along a wall of the cover plate 9 that delimits it. The cover plate 9 is screwed to a housing 11, which has corresponding threads, by means of threaded bolts, which are not shown and which are or can be inserted into bores 9b (the representation of the same bore 9b opposite the visible bore 9b is concealed by the representation of the carrier plate 7 and can be seen in a plan view in FIG. 2) of the cover plate 9, so that the cover plate 9 is centred and tangentially locked with respect to the longitudinal axis 2 and the carrier plate 3 is axially locked. Between the housing 11 and the cover plate 9, a jacket ring 10 made of an aluminium alloy (conceivable and also possible is glass or steel in each case instead of the aluminium alloy) is axially prestressed, which hermetically seals a transition area between the cover plate 9 and the housing 11.

The cover plate 9 and the housing 11 are screwed to the housing 11, which has corresponding threads, by means of other, larger threaded bolts which are not shown and which are or can be inserted into corresponding bores 9c (all of which can be seen in a plan view in FIG. 2) of the cover plate 9, so that in this way an assembly is formed which can be axially dismantled or axially assembled by loosening or tightening the threaded bolts. In this way, an assembly is formed which can be axially dismantled or axially mounted by loosening or tightening the threaded bolts and which comprises the carrier plate 3, the cover plate 9, the casing ring 10 and the housing 11 together with a motorised adjustment mechanism which is not visible in FIG. 1 and which is attached to the housing 11. The motorised adjustment mechanism is described in more detail with reference to FIG. 3.

The housing 11 is circumferentially provided with threaded holes 11a for fastening threaded bolts which, if necessary, serve to compensate for an imbalance of the adjustment device and can be screwed into the threaded holes 11 to different depths for this purpose in order to position a centre of gravity of the adjustment device 1 on the longitudinal axis 2 accordingly.

The housing 11 is connected to the base body 12 of the adjustment device 1 by means of threaded bolts, which are or can be arranged to pass in sections through corresponding bores in the base body 12, and wherein the housing 11 has corresponding threads.

Figure 2:
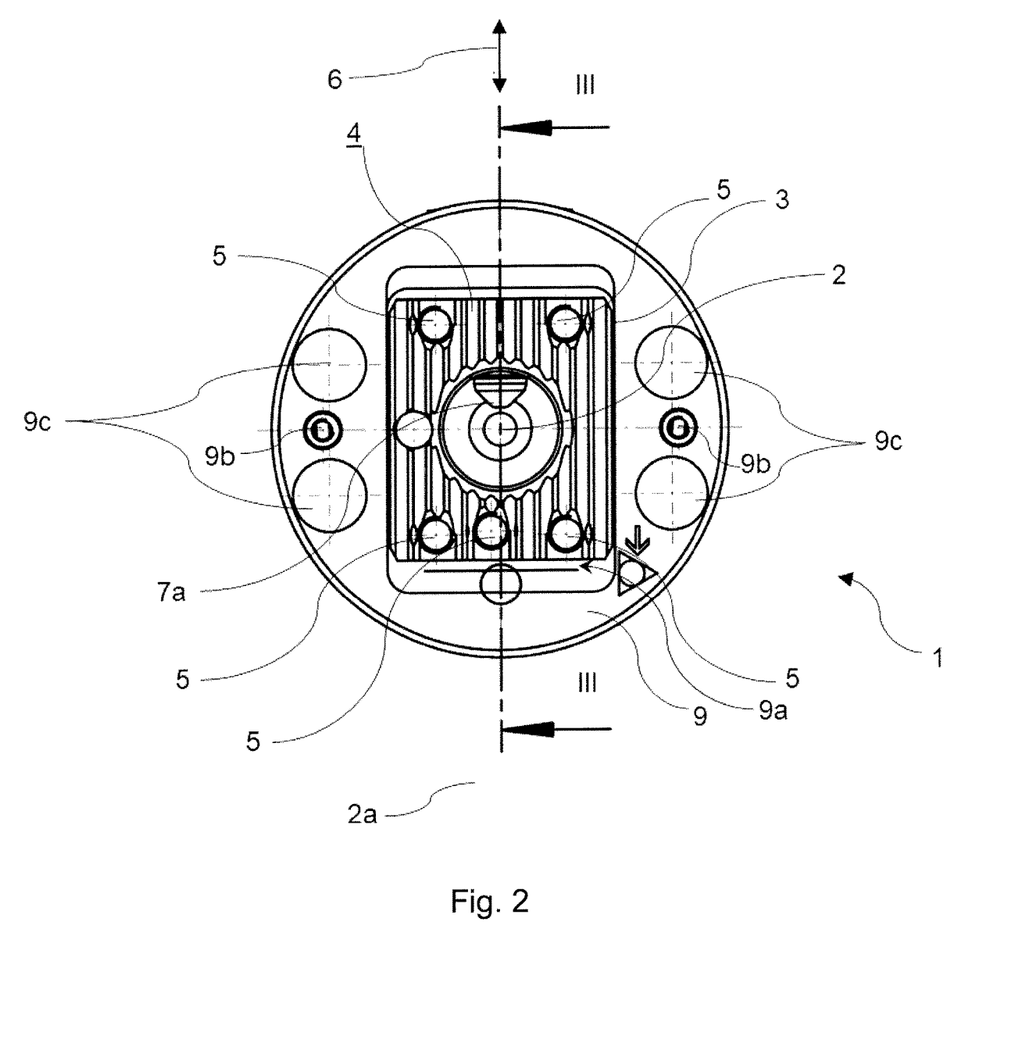
FIG. 2: A schematic representation of the adjustment device from FIG. 1 in a front view in the direction of view of arrow II from FIG. 1.

FIG. 2 shows a schematic representation of the adjustment device 1 in a front view in the direction of view of arrow II from FIG. 1. In FIG. 2 it is particularly well seen that the directions 6 are oriented radially to the longitudinal axis 2.

Figure 3:
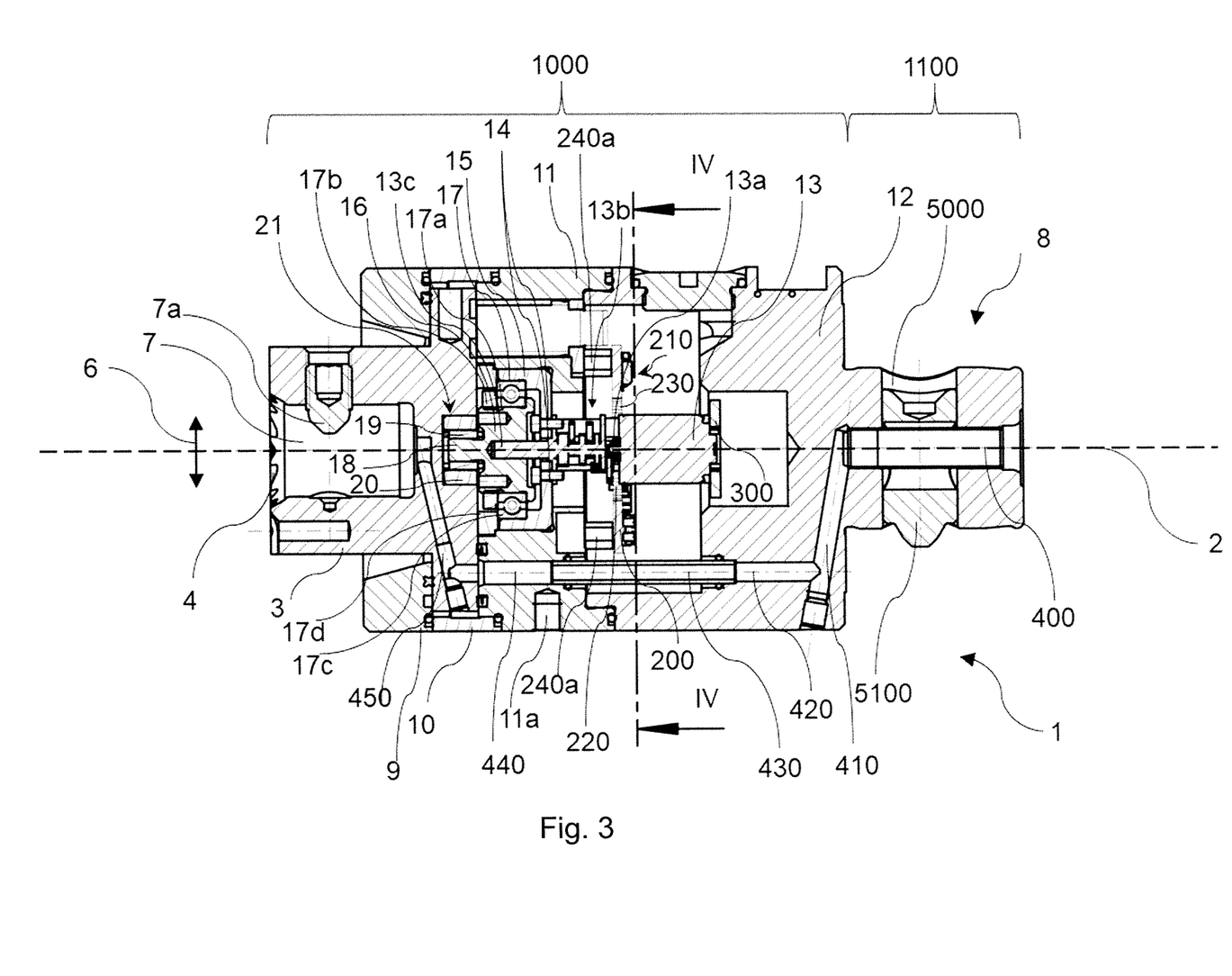
FIG. 3: A schematic sectional view of the adjustment device from FIG. 1 according to the sectional line III from FIG. 2 in the direction of view of the arrows from FIG. 2 assigned to the sectional line III.

FIG. 3 shows a schematic sectional view of the adjustment device 1 according to sectional line III from FIG. 2 in the direction of view of the arrows from FIG. 2 assigned to sectional line III. In FIG. 3, the internal structure of the adjustment device 1 is particularly clear. It can be seen from FIG. 3 that an electric motor 13 is cantilever mounted inside the adjustment device 1. The electric motor 13 is further arranged around the longitudinal axis 2, so that the electric motor 13 is substantially (i.e. insofar as the electric motor 13 is rotationally symmetrical) balanced when the adjustment device 1 is rotated around the longitudinal axis 2. This may also be referred to as the axial arrangement of the electric motor 13. When the electric motor 13 is activated, for example by electric current flowing through its stator windings not shown, for example by means of an induction device not shown, a pinion 13a, which is non-rotatably connected to a motor shaft of the electric motor 13, of the electric motor 13 is rotated about the longitudinal axis 2, the pinion 13a being aligned with the longitudinal axis 2. The pinion 13a meshes with a multi-stage spur gear 13b so that a relatively high speed of the pinion 13a, for example 1000 revolutions per minute, is reduced to a relatively low speed of an output shaft 13c, for example one revolution per minute, of the spur gear 13b. At this point it is explicitly stated that the electric motor 13, which comprises the pinion 13a, forms a drive unit with the spur gear 13b, which comprises the gear output shaft 13c.

The gear 13b, which is screwed to the electric motor 13 outside a region of the pinion 13 so that it cannot rotate, is connected to a bearing cover 15 by means of screws 14. The output shaft 13c is arranged to pass through the bearing cover 15 and is non-rotatably connected to a journal carrier wheel 16, which is rotatably mounted about the longitudinal axis 2 in the bearing cover 15 by means of a rolling ball bearing 17. A radially inner ring 17a of the rolling ball bearing 17 is axially preloaded by means of a threaded ring 17b screwed onto the journal carrier wheel 16, so that the ring 17a is pressed against a radially projecting stop of the journal carrier wheel 16. A radially outer ring 17c of the rolling ball bearing 17 is axially preloaded against the housing 11 by means of a retaining plate 17d, the retaining plate 17d being screwed to the housing 11. In order to set a defined preload, the retaining plate 17d and the bearing cover 15 are spaced apart by a tangentially circumferential gap. The retaining plate 17d then serves to ensure that the housing cover 15 and thus the journal carrier wheel 16 mounted therein are connected to the housing 11 so that the journal carrier wheel 16 can be driven by the electric motor 13 via the gear output shaft 13c. In such a driven state, an eccentric pin 18 monolithically connected to the journal carrier wheel 16 orbits about the longitudinal axis 2 on a circular path because an axis of rotational symmetry of the eccentric pin 18 is radially offset with respect to the longitudinal axis.

The electric motor 13, the gear 13b, the bearing cover 14 and the journal carrier wheel 16 form a further assembly, in particular because the gear 13 and the journal carrier wheel 16 are each connected to the bearing cover 15 as disclosed, which is passed through a printed circuit board 200, so that this assembly can be axially mounted or axially dismounted without the printed circuit board 200 having to be dismantled or mounted for this purpose (the printed circuit board 200 will be discussed in more detail below). This is done in particular by tightening or loosening screws that connect the retaining plate 17b to the housing 11 in a reversibly releasable manner.

The eccentricity, i.e. the radial distance between the axis of rotational symmetry of the eccentric pin 18 and the longitudinal axis 2, is exemplarily 0.25 mm, according to which the adjustment device 1 can also be called a fine adjustment device or fine adjustment head. The eccentric pin 18, which is cylindrical, is rotatably mounted in a sliding block 20 by means of a needle bearing 19. The sliding block 20 is slidingly mounted in a longitudinal groove 21 of the carrier plate 3 extending perpendicular to the drawing plane of FIG. 3. When the eccentric pin 18 is driven, the sliding block 20 slides along the longitudinal groove 21 due to the eccentricity of the eccentric pin 18 with respect to the longitudinal axis 2 and thus a longitudinal axis of the pinion 13a, whereas, due to the positive fit seen in FIG. 3, the carrier plate 3 is moved in translation in the directions 6 relative to the longitudinal axis 2 and thus the longitudinal axis of the pinion 13a between the housing cover 9 and the housing ring 6 when the gear output shaft 13c and thus the journal carrier wheel 16 performs a complete revolution about the longitudinal axis 2. In order to set a certain displacement, which is locked in the case of a powerless state of the electric motor 13 due to a self-locking of the gear 13b, of the carrier plate 3 in one of the directions 6, the gear output shaft 13c is therefore rotated by a fraction of a whole revolution about the longitudinal axis 2 by means of the gear 13b and the electric motor 13.

Figure 4:
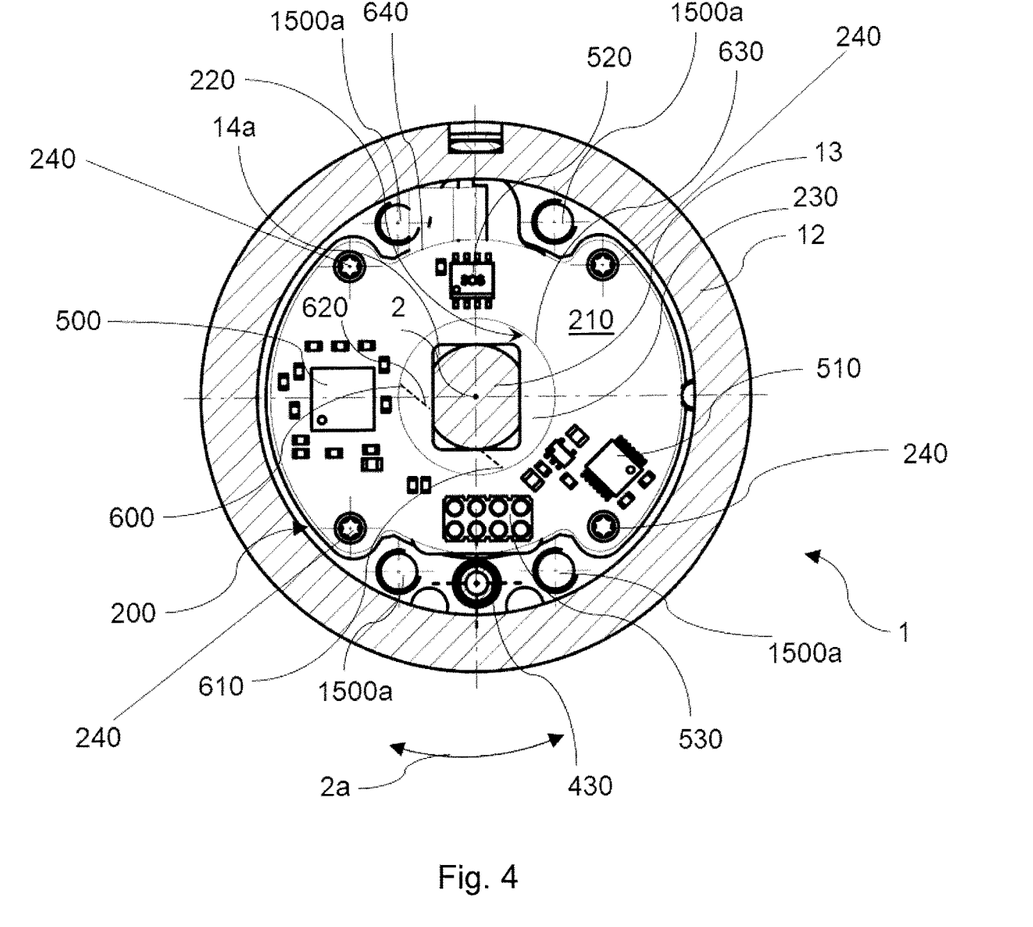
FIG. 4: A schematic sectional view of the adjustment device of FIG. 1 according to the sectional line IV of FIG. 1 in the direction 3 of view of the arrows assigned to the sectional line IV of FIG. 3.

FIG. 3 further shows particularly well that a printed circuit board 200 with a control circuit comprising electronic components is implemented on a functional surface 210 facing away from the carrier plate 3 in the adjustment device 1 to control the electric motor 13 and thereby the pinion 13a, the journal carrier wheel 16 and finally the carrier plate 3 on the basis of one or more measurement signals, which may also be referred to as input signal(s) (the measurement signal(s) may correspond, for example, to information about a predetermined bore diameter or deviation from a predetermined bore diameter). (the measurement signal(s) may, for example, correspond to information about a predetermined bore diameter or a deviation from a predetermined bore diameter). The printed circuit board 200 has a cylindrical surface 220 which surrounds a corresponding bore 230 of the printed circuit board 200 in a circularly closed manner with a centre point on the longitudinal axis 2, so that the printed circuit board 200 is balanced with respect to a rotation about the longitudinal axis 2 in a state without a control circuit (as far as the printed circuit board 200 is rotationally symmetrically formed). The printed circuit board 200 is rotated about the longitudinal axis 2 in the case of a rotation of the adjustment device 1 about the longitudinal axis 2, because the printed circuit board 200 is connected to the housing 11 in a rotationally fixed manner by means of fastening screws 240 (the top view of which is shown in FIG. 4), the screws 240 being arranged in sleeves 240a in sections and the printed circuit board 200 resting accordingly on the sleeves 240. The screws 240 are screwed into the housing 11.

The printed circuit board 200 or its control circuit can be connected directly or indirectly in a data-communicating manner to another printed circuit board 300, which is provided with power electronics not shown in more detail, by means of conductive means or the like not shown, whereby the conductive means can be passed through the bore 230 in sections so that they can be connected to a plug contact on a side facing the carrier plate 3, i.e. opposite the functional surface 210. The printed circuit board 300 is thereby electrically connected to stator windings of the electric motor 13.

From FIG. 3, it is also particularly clear that a first coolant duct system is formed in the housing 11 and the base body 12, which system consists of a coolant 400 pipe arranged in the connecting section and the base body 12 parallel to the longitudinal axis 2, which pipe is screwed into the base body 12 in an end region, a duct bore 410 of the base body 12 arranged at an angle to the longitudinal axis 2, i.e. not parallel, a duct bore 420 of the base body 12 arranged parallel to the longitudinal axis 2, a coolant pipe 430 of the housing 11 arranged in sections in the duct bore 40 parallel to the longitudinal axis 2, and a duct bore 440 of the housing 11 arranged parallel to the longitudinal axis 2, a coolant pipe 430 inserted in sections in the channel bore 240 and arranged parallel to the longitudinal axis 2, and a channel bore 440 of the housing 11 arranged parallel to the longitudinal axis 2, and a second coolant channel system is formed on the side of the carrier plate, which is formed from a channel bore 450 of the carrier plate 3 arranged at an angle to the longitudinal axis 2 in the carrier plate 3. Accordingly, the two coolant channel systems are connected to each other in a communicating manner, so that a coolant entering the coolant tube 400 emerges from the channel bore 450 and in this way floods the bore 7 in certain areas, after which the machining tool not shown and/or a bore wall not shown in a workpiece is or are supplied with the coolant.

FIG. 3 also shows particularly well that a bolt 0510 is arranged in a bore 0500 of the connecting section transverse to the longitudinal axis 2, which bolt can be brought into positive engagement with a spindle adapter element so that a torque can be transmitted from a tool spindle to the adjustment device 1.

It is also particularly clear from FIG. 3 that an axial length, which is designated by the reference sign 1000 and is dimensioned from the base body 12 to the carrier plate 3, is greater by a factor of 3.4 than an axial length, which is designated by the reference sign 1100 and is used to dimension the connecting section, which corresponds to a reciprocal measure of the compactness of the adjustment device 1. Conceivable and also possible are smaller amounts of this factor (<3.4), for example 3.3, 3.2, 3.1, 3.0, 2.9, 2.8, 2.7, 2.6, 2.7, 2.6, 2.5, 2.4, 2.3, 2.2, 2.1 or 2.0.

Furthermore, it can be seen from FIG. 3 that the length 1000 is independent of the dimensions of the printed circuit board 200 because the latter is shorter in the axial direction than the electric motor 13 and is arranged tangentially around the latter.

FIG. 4 shows a schematic sectional view of the adjustment device 1 according to the sectional line IV of FIG. 3 in the direction of view of the arrows of FIG. 3 assigned to the sectional line IV. In FIG. 4 the printed circuit board 200 is particularly well visible. Accordingly, the control circuit is formed, inter alia, by electronic components 500, 510, 520 and 530 connected to one another by means of conductor tracks which run within the printed circuit board 200, the component 530 being designed as an electronic connector for connection to another printed circuit board, so that the control circuit can receive an input signal and output a corresponding output signal, which is calculated by means of the control circuit, in order to adjust the carrier plate 3 in a predetermined manner. Two surface points 600 and 610 of the surface 220 can be connected by a connecting straight line 620, as shown in FIG. 4. The connecting line 620 intersects or pierces the electric motor 13. The bore 230, in which the electric motor 13, the pinion 13a and the gear 13b are arranged in sections, is annularly enclosed by a circular rim 630 shown in FIG. 4, the longitudinal axis 2 being an axis of rotational symmetry of the bore 230 or of the rim 630. It is readily apparent that the centre of the bore 230, i.e. a circle bounded by the rim 630, is associated with the two-dimensional centre of gravity coordinates of the printed circuit board 200, which is bounded by a butterfly-shaped outer rim 640. The centre of gravity coordinates are also a point on the longitudinal axis 2 in the geometric sense.

FIG. 4 further shows that the housing 11 has threaded holes 1500a into which corresponding threaded bolts can be screwed in the area of their respective threads in order to connect the base body 12 to the housing 11.

Figure 5:
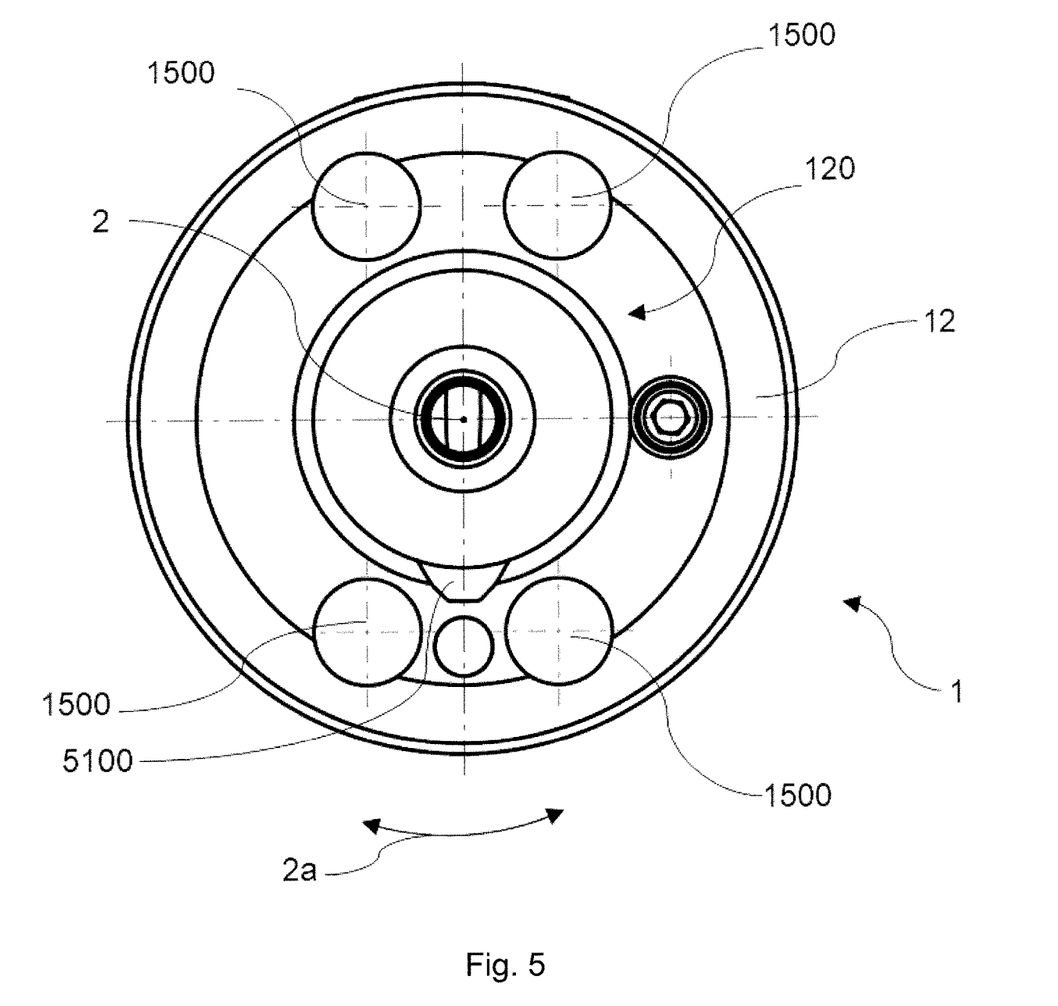
FIG. 5: a schematic representation of the adjustment device from FIG. 1 in a rear view in the direction of view of arrow V from FIG. 1.

FIG. 5 shows a schematic representation of the adjustment device 1 in a rear view in the direction of view of the arrow V from FIG. 1, so that from a synopsis of FIG. 1 to FIG. 5 the adjustment device 1, which is built compactly along the longitudinal axis 2 and reducing an unbalance with respect to a rotation about the longitudinal axis 2, is shown schematically.

Finally, in FIG. 5 it can be seen that the base body 12 has holes 1500 through which threaded bolts not shown can or are passed in order to connect the base body 12 to the housing 11 by means of the threaded holes 1500a (these are shown in FIG. 4 in a plan view).

The invention claimed is:

1. An adjustment device adapted to be driven in rotation about a longitudinal axis, for adjusting a cutting tool, comprising:

a cutting tool carrier element supported for carrying out an adjusting movement, a drive unit for driving the cutting tool carrier element and a circuit carrier element having a surface region facing the drive unit for forming at least one electronic control circuit provided for controlling the drive unit, wherein two surface points of the surface region are arranged to be connected outside the circuit carrier element by a connecting straight line, end points of which are the two surface points, wherein the circuit carrier element is connected in a rotationally fixed manner to a base body of the adjustment device which is rotatable about the longitudinal axis, the base body having a connecting section for connection to a tool spindle, wherein when the rotationally fixed connection is realized directly it is realized by means of a screw element connection, wherein at least one screw for fastening the circuit carrier element is arranged in a thread of the base body, wherein when the rotationally fixed connection is realized indirectly the circuit carrier element is connected in a rotationally fixed manner to a housing which is different from the base body and is connected in a rotationally fixed manner to the base body, and wherein at least one screw for fastening the circuit carrier element being arranged in a thread of the housing.

2. The adjustment device according to claim 1, wherein the connecting straight line is arranged to be traversing the drive unit.

3. The adjustment device according to claim 1, wherein the drive unit is arranged to be at least partially reaching through a recess of the circuit carrier element.

4. The adjustment device according to claim 1, wherein the recess is delimited by a circumferentially closed edge of the circuit carrier element.

5. The adjustment device according to claim 1, wherein a maximum longitudinal dimension of the circuit carrier element dimensioned parallel to the longitudinal axis is smaller than or equal to a maximum transverse dimension of the circuit carrier element dimensioned parallel to a transverse axis oriented perpendicular to the longitudinal axis.

6. The adjustment device according to claim 1, wherein a movement converter, adapted to be kinematically coupled to the cutting tool carrier element and the drive unit, is provided for converting a movement of a movement element of the drive unit into the adjusting movement.

7. The adjustment device according to claim 6, wherein the drive unit comprises a toothed gear and an electric motor operatively connected to the toothed gear, wherein a gear shaft of the toothed gear is adapted to be brought into engagement with the movement converter, and the circuit carrier element is arranged perpendicularly to a gear axis adapted to be associated with the gear shaft.

8. The adjustment device according to claim 1, wherein the drive unit is arranged axially.

9. The adjustment device according to claim 1, wherein the drive unit and the movement converter are connected to one another to form a first assembly which can be axially dismantled or axially mounted separately from the circuit carrier element.

10. The adjustment device according to claim 9, wherein the drive unit, the movement converter, the cutting tool carrier element and the circuit carrier element are connected to one another to form an axially dismountable or axially mountable second assembly.

11. The adjustment device according to claim 1, wherein the circuit carrier element is configured for data communication with the drive unit on a side facing away from the cutting tool carrier element.

12. The adjustment device according to claim 1, wherein measuring means adjacent to the circuit carrier element are provided for measuring an adjustment distance which can be assigned to the adjustment movement, and in that the circuit carrier element is configured to provide a control signal on the basis of measurement data obtained by means of the measuring means.

13. A cutting system comprising:
a cutting tool,
an adjustment device operatively connected to the cutting tool for adjusting the cutting tool, and
a rotationally drivable main drive element operatively connected to the adjustment device for providing a machining movement of the cutting tool, wherein the adjustment device is configured according to claim 1.

* * * * *